US010502753B2

(12) United States Patent
Gunji et al.

(10) Patent No.: US 10,502,753 B2
(45) Date of Patent: Dec. 10, 2019

(54) ROLLING BEARING UNIT FOR WHEEL SUPPORT

(71) Applicant: NSK LTD., Tokyo (JP)

(72) Inventors: Daisuke Gunji, Fujisawa (JP); Hiroshi Kawahara, Fujisawa (JP); Fumiaki Soda, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/780,962

(22) PCT Filed: Oct. 31, 2016

(86) PCT No.: PCT/JP2016/082242
§ 371 (c)(1),
(2) Date: Jun. 1, 2018

(87) PCT Pub. No.: WO2017/094419
PCT Pub. Date: Jun. 8, 2017

(65) Prior Publication Data
US 2018/0372769 A1 Dec. 27, 2018

(30) Foreign Application Priority Data

Dec. 4, 2015 (JP) .................................. 2015-237376
Jan. 15, 2016 (JP) .................................. 2016-006139

(51) Int. Cl.
G01P 3/44 (2006.01)
F16C 41/00 (2006.01)
(Continued)

(52) U.S. Cl.
CPC .......... G01P 3/446 (2013.01); B60B 27/0068 (2013.01); B60B 35/02 (2013.01);
(Continued)

(58) Field of Classification Search
CPC ...... F16C 19/18; F16C 19/196; F16C 41/004; F16C 2326/02; F16C 19/186;
(Continued)

(56) References Cited

U.S. PATENT DOCUMENTS 6,161,962 A * 12/2000 French .................... B61F 15/20
                                                           384/448
7,018,106 B2 * 3/2006 Okada ..................... B60B 27/00
                                                           384/448
(Continued)

FOREIGN PATENT DOCUMENTS

JP 2003-262645 A 9/2003
JP 2003-278779 A 10/2003
(Continued)

OTHER PUBLICATIONS

Int. Search Report dated Jan. 10, 2017 issued by the Int. Searching Authority in corresponding Application No. PCT/JP2016/082242 (PCT/ISA/210).
(Continued)

Primary Examiner — Marcus Charles
(74) Attorney, Agent, or Firm — Sughrue Mion, PLLC

(57) ABSTRACT

A charger incorporated in a vehicle wheel supporting rolling bearing unit detects an output voltage of an electric generator and calculates a rotation speed of a hub. When a rotation speed of the hub is in a low speed state where a sensor and a wireless communication device are operated by electric power supplied 5 by a battery, a frequency of wireless communication performed between the wireless communication device and a calculator disposed on a vehicle body side is changed according to the rotation speed of the hub or a traveling speed of a vehicle.

7 Claims, 8 Drawing Sheets

(51) Int. Cl.
    *F16C 19/18*    (2006.01)
    *B60C 23/04*    (2006.01)
    *B60B 27/00*    (2006.01)
    *B60B 35/02*    (2006.01)
    *H02K 21/22*    (2006.01)
    *H02K 7/18*     (2006.01)

(52) U.S. Cl.
    CPC ........ *B60C 23/041* (2013.01); *B60C 23/0413* (2013.01); *B60C 23/0447* (2013.01); *B60C 23/0455* (2013.01); *F16C 19/186* (2013.01); *F16C 41/004* (2013.01); *H02K 7/1846* (2013.01); *H02K 21/22* (2013.01); *F16C 19/18* (2013.01); *F16C 2326/02* (2013.01)

(58) Field of Classification Search
    CPC .... G01D 3/446; B60B 27/0068; B60B 35/02; B60C 23/041; B60C 23/043; B60C 23/0447; B60C 23/0413; B60C 23/0455; H02K 21/22; H02K 7/1846
    USPC ......... 384/446, 448, 544, 589; 324/173–174, 324/207.25
    See application file for complete search history.

(56)             References Cited

U.S. PATENT DOCUMENTS 8,568,099  B2*  10/2013  Sabannavar  ........ G01M 13/028
                                                        416/170 R
    9,304,142  B1*   4/2016  Gurganian  .............. G01P 1/026

2003/0234578  A1   12/2003  Takahashi et al.
    2004/0105602  A1*   6/2004  Mizutani ................. F16C 33/78
                                                        384/448
    2005/0190049  A1    9/2005  Kuchler
    2005/0231346  A1*  10/2005  Ichinose ............... B60C 23/041
                                                        340/447
    2005/0258950  A1   11/2005  Sahashi et al.
    2005/0285726  A1   12/2005  Haswell et al.
    2007/0018837  A1    1/2007  Mizutani et al.
    2008/0133100  A1    6/2008  Takahashi et al.
    2009/0013773  A1    1/2009  Acker

FOREIGN PATENT DOCUMENTS

JP       2004-224069 A       8/2004
    JP         2005-78341 A       3/2005
    JP        2005-112017 A       4/2005
    JP        2005-280395 A      10/2005
    JP         2006256490 A  *   9/2006   ............ B60C 23/02
    JP        2008-524680 A       7/2008
    JP        2010-160064 A       7/2010
    JP        2015-070777 A       4/2015

OTHER PUBLICATIONS

Written Opinion dated Jan. 10, 2017 issued by the Int. Searching Authority in corresponding Application No. PCT/JP2016/082242 (PCT/ISA/237).
Communication dated Nov. 30, 2018, issued by the European Patent Office in counterpart European Application No. 16870359.3.
Communication issued Oct. 8, 2019 by the Japanese Patent Office in a corresponding Japanese Patent Application No. 2016-006139.

\* cited by examiner

ROLLING BEARING UNIT FOR WHEEL SUPPORT

CROSS-REFERENCE TO RELATED APPLICATIONS

This application is a 371 of PCT/JP2016/082242 filed on Oct. 31, 2016, which is based upon Japanese Patent Application No. 2016-006139 filed on Jan. 15, 2016, and Japanese Patent Application No. 2015-237376 filed on Dec. 4, 2015. The entire disclosures of the prior applications are considered part of the disclosure of the accompanying National Stage Application, and are hereby incorporated by reference.

TECHNICAL FIELD

The present invention relates to a vehicle wheel supporting rolling bearing unit.

BACKGROUND ART

There have been proposed various control methods and control devices to improve motion performance and safety performance of automobiles. Since motion such as running, turning and stopping of an automobile can only be operated via a friction force (grip force, tire force) between a tire and a road surface, detecting a force (load) acting on the tire can largely contribute to performance improvement related to automobile motion control. Therefore, a plurality of techniques related to detecting the force acting on the tire has been proposed.

Prior to the present invention, the applicant of the present invention previously considered a configuration of a vehicle wheel supporting rolling bearing unit having functions of supplying electric power to a sensor provided on a vehicle wheel (tire or wheel) and wirelessly communicating information acquired by the sensor to a vehicle body side (unpublished prior application: Japanese Patent Application No. 2015-186307). In the prior application, an electric generator is incorporated in a vehicle wheel supporting rolling bearing unit as a means for supplying electric power to a sensor. Further, in the prior application, handling of wiring can be eliminated completely when assembling the vehicle wheel supporting rolling bearing unit since a wireless communication device for wirelessly transmitting an output signal of a sensor is included. Patent document 1 describes an invention in which a power generation function and a power supply function are provided in a bearing unit to supply power to a sensor and perform radio communication.

However, when the electric generator provided in the bearing unit is used to supply electric power, following problems may occur in a case where a rotation speed of the vehicle wheel is low, that is, when a vehicle speed is low. In other words, since a generated voltage of the electric generator is generally proportional to the rotation speed of a rotor configuring the electric generator, it is difficult to ensure a generated voltage sufficient to operate the sensor and various circuits when the rotation speed is low. On the other hand, it is possible to increase a generated voltage at a low speed by increasing a number of coil turns of the electric generator, but even in such a case, there has to be a lower limit speed, and power cannot be generated when the vehicle is stopped. Further, since a rotation speed of a rotation side bearing ring member of the bearing unit for supporting the rotor largely varies according to a traveling speed of the vehicle, the generated voltage becomes undesirably excessive in high speed traveling when the generated voltage in low speed traveling is increased.

In order to solve the above problems, the inventors of the present application firstly considered to provide the bearing unit with a battery and a charge control circuit for the battery. In other words, in a case where a sufficient power generation amount cannot be obtained by the electric generator, such as in low speed traveling (including a case where the vehicle is stopped), a sensor and a wireless communication circuit are operated by electric power supplied from the battery. In a case where a sufficient power generation amount can be obtained by the electric generator, the sensor and the wireless communication circuit are operated and the battery is charged with the generated power. The charge control circuit controls the operations according to a generated voltage. According to the above configuration, the generated voltage is not excessive in high speed traveling, and electric power can be sufficiently supplied to the sensor and the wireless communication circuit even in low speed traveling.

However, in a case of simply adopting the configuration described above, there is a possibility that a large battery with a sufficient storage capacity has to be used according to a frequency of low speed traveling in a vehicle traveling time and power consumption of the sensor and the wireless communication circuit. The battery is advantageously as small as possible since it is disposed inside the bearing unit. Also, since a volume of the battery depends on the storage capacity, it is necessary to reduce a required storage capacity as much as possible so as to reduce the size of the battery.

Meanwhile, in consideration of using information on force (tire load) acting on a vehicle wheel acquired by the sensor for controlling motion of the vehicle, the necessity of the vehicle motion control is relatively lower in low speed traveling than high speed traveling. Also, when considering a traveling distance (running distance) of the vehicle, a time required for the vehicle to travel a certain distance increases as the vehicle speed decreases. Accordingly, low update frequency of the sensor information is acceptable (that is, a long update time interval is acceptable) when the vehicle speed is low.

Patent Documents 2 and 3 are other prior art related to the present invention. Patent Document 2 describes a technique in which a bearing unit includes a device for operating a sensor by contactless power supply, a power supply monitoring unit is provided for the device to monitor a received voltage and control the wireless transmission power according to the voltage value. However, the invention described in Patent Document 2 is directed to contactless power supply and controls transmission power. Patent Document 3 describes that power is supplied to a sensor provided on a vehicle wheel side by an electric generator or a battery, but using both the electric generator and the battery in combination is not described. Further, power required for wireless communication is also not described.

PRIOR ART DOCUMENT

Patent Document

Patent Document 1: JP-A-2003-278779
Patent Document 2: JP-A-2005-78341

Patent Document 3: JP-T-2008-524680

SUMMARY OF INVENTION

Problems to be Solved by Invention

An object of the present invention is to provide a vehicle wheel supporting rolling bearing unit capable of reducing capacity of a battery incorporated therein.

Means for Solving the Problems

A vehicle wheel supporting rolling bearing unit according to the present invention rotatably supports a vehicle wheel (a tire and a wheel) to a suspension device, and includes a bearing part, a wireless communication device (including a wireless communication circuit), an electric generator and a battery, and optionally a charge control circuit.

The bearing part includes an outer diameter side bearing ring member, an inner diameter side bearing ring member, and a plurality of rolling elements.

The outer diameter side bearing ring member is configured, for example, in a substantially annular shape (a cylindrical shape), and has one or more (for example, double rows) outer ring raceways on an inner peripheral surface.

The inner diameter side bearing ring member is configured, for example, in a substantially annular shape (a cylindrical shape), is arranged at a radially inner side of the outer diameter side bearing ring member, and has one or more (for example, double rows) inner ring raceways on an outer peripheral surface.

Balls or rollers (including tapered rollers, cylindrical rollers, needle rollers, and spherical rollers), for example, can be used for the rolling elements, and the rolling elements are rollably provided between the outer ring raceway and the inner ring raceway.

In a use state, one of the outer diameter side bearing ring member and the inner diameter side bearing ring member is a stationary side bearing ring member which is supported and fixed to the suspension device to be non-rotatable, and the other bearing ring member is a rotation side bearing ring member which is coupled and fixed to the vehicle wheel and rotates together with the vehicle wheel.

The wireless communication device wirelessly communicates a signal (for example, a signal representing a traveling state of a vehicle, an operating state of an engine or the like transmitted from a vehicle body side, as necessary) including an output signal of a sensor mounted on the vehicle wheel for example, with an electronic equipment arranged at a vehicle body side.

The electric generator includes a stator directly or indirectly supported by the stationary side bearing ring member and a rotor directly or indirectly supported by the rotation side bearing ring member, and generates electric power to be supplied to the sensor (a sensor which measures state quantity of the vehicle wheel, such as a strain sensor, an acceleration sensor, an air pressure sensor, a wear sensor and a temperature sensor) and the wireless communication device based on relative rotation between the stator and the rotor.

The battery stores electric power generated by the electric generator.

According to the vehicle wheel supporting rolling bearing unit of the present invention, electric power from the battery is supplied to the sensor and the wireless communication device when an power generation amount of the electric generator is not sufficient to operate the sensor and the wireless communication device, and only electric power from the electric generator is supplied to the sensor and the wireless communication device when the power generation amount of the electric generator is (enough) sufficient to operate the sensor and the wireless communication device.

In particular, in the vehicle wheel supporting rolling bearing unit of the present invention, the wireless communication device changes (varies) a wireless communication frequency (time interval) which is a frequency of performing wireless communication with the electronic equipment (transmitting sensor information to the electronic equipment) according to the rotation speed of the rotation side bearing ring member.

Incidentally, the wireless communication frequency may be expressed by a number of times of wireless communication performed per unit time, for example.

In the above configuration, the wireless communication device (or the charger) for example, has a function of detecting an output voltage of the electric generator which varies according to the rotation speed of the rotation side bearing ring member, and the output voltage may be used to obtain the rotation speed of the rotation side bearing ring member. As a means for obtaining the wireless communication frequency based on the rotation speed, for example, a calculation formula or a chart (a table or a map) showing a relationship between the rotation speed and the wireless communication frequency prepared in advance may be used.

Alternatively, the electronic equipment (calculator) provided on the vehicle body side may determine the wireless communication frequency based on a traveling speed of the vehicle. In this case, as a means for obtaining the wireless communication frequency based on the traveling speed of the vehicle, for example, a calculation formula or a chart (a table or a map) showing a relationship between the traveling speed and the wireless communication frequency prepared in advance may be used. Further, the determined wireless communication frequency is transmitted to the wireless communication device on the vehicle wheel supporting rolling bearing unit side by wireless communication, so that the wireless communication device can perform wireless communication at the wireless communication frequency.

Specifically, the wireless communication frequency is increased when the rotation speed of the rotation side bearing ring member or the traveling speed of the vehicle is equal to or higher than a predetermined speed, and is decreased when the rotation side bearing ring member or the traveling speed of the vehicle is lower than the predetermined speed.

In the above configuration, for example, the wireless communication frequency may be made proportional to the rotation speed of the rotation side bearing ring member or the traveling speed of the vehicle, so that a traveling distance (a traveling distance until the next wireless communication is performed) of the vehicle at each time interval of the wireless communication can be made substantially equal.

Effect of the Invention

According to the vehicle wheel supporting rolling bearing unit of the present invention, capacity of a battery therein can be reduced.

That is, when the sensor and the wireless communication device are operated by the electric power supplied by the battery in low speed traveling, a frequency of wireless communication (wireless communication frequency) performed between the wireless communication device and the electronic equipment disposed on the vehicle body side is changed according to the rotation speed of the rotation side bearing ring member (hub) or the traveling speed of the vehicle. Therefore, power consumption of the battery used by the wireless communication device can be effectively reduced. Therefore, storage capacity of the battery can be reduced, so that a volume of the battery is reduced, and the cost can also be reduced. Further, since the wireless communication frequency is changed according to a vehicle speed, degradation of performance related to vehicle motion control can be reduced even in a case where the wireless communication frequency is reduced and an update interval of the sensor information becomes longer.

DESCRIPTION OF EMBODIMENTS

First Embodiment

Figure 1:
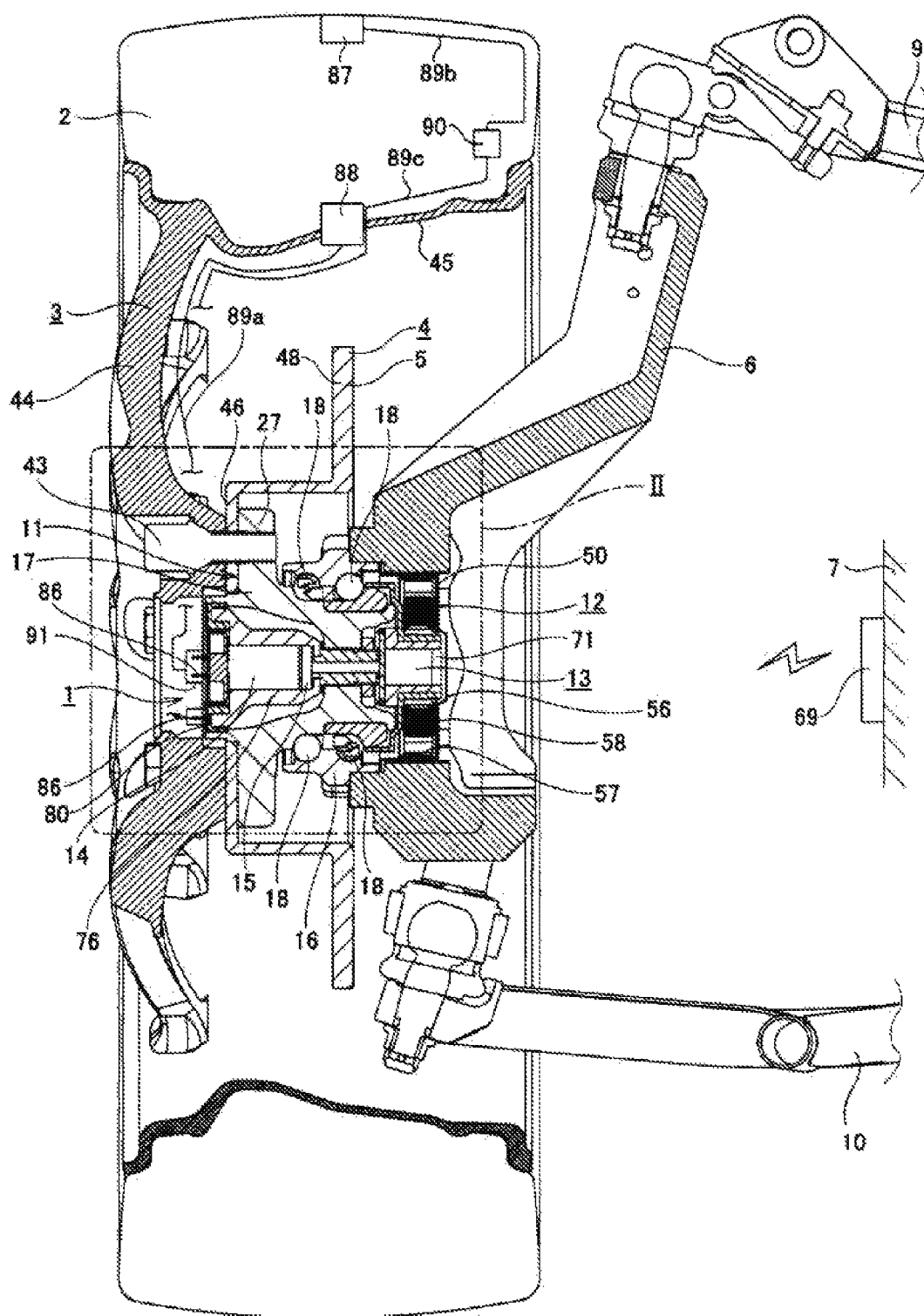
FIG. 1 is a cross-sectional view showing a vehicle wheel supporting structure in which a vehicle wheel is supported to a suspension device by a vehicle wheel supporting rolling bearing unit according to a first embodiment of the present invention.

A first embodiment of the present invention will be described with reference to FIGS. 1 to 8. A vehicle wheel supporting rolling bearing unit 1 according to the present embodiment is used for a driven wheel and rotatably supports a tire 2 and a wheel 3 configuring a vehicle wheel of an automobile as well as a brake rotor 5 configuring a disc brake device 4 which is a braking device to a knuckle 6 configuring a suspension device. In the illustrated structure, the knuckle 6 is supported by an upper arm 9 and a lower arm 10 which are supported to a vehicle body 7 in a pivotably displaceable manner.

The vehicle wheel supporting rolling bearing unit 1 includes a bearing part 11 having a bearing function, an electric generator 12 having a power generation function, a wireless communication device (including a wireless communication circuit) 13 having a wireless communication function, a battery 14 having an electric power storage function, and a charger (including a charge control circuit) 15 having a charging function.

The bearing part 11 rotatably supports the tire 2 and the wheel 3 to the knuckle 6 and includes an outer ring 16 which is an outer diameter side bearing ring member, a hub 17 which is an inner diameter side bearing ring member, and a plurality of balls (rolling elements) 18, 18.

The outer ring 16 is formed in a substantially annular shape as a whole and has double-row outer ring raceways 19a, 19b on an inner peripheral surface and a stationary side flange 20 at an inner end side portion of an axially intermediate portion on an outer peripheral surface. The stationary side flange 20 includes a plurality of mounting holes (screw holes or through holes) 21, 21 penetrating in an axial direction.

Figure 2:
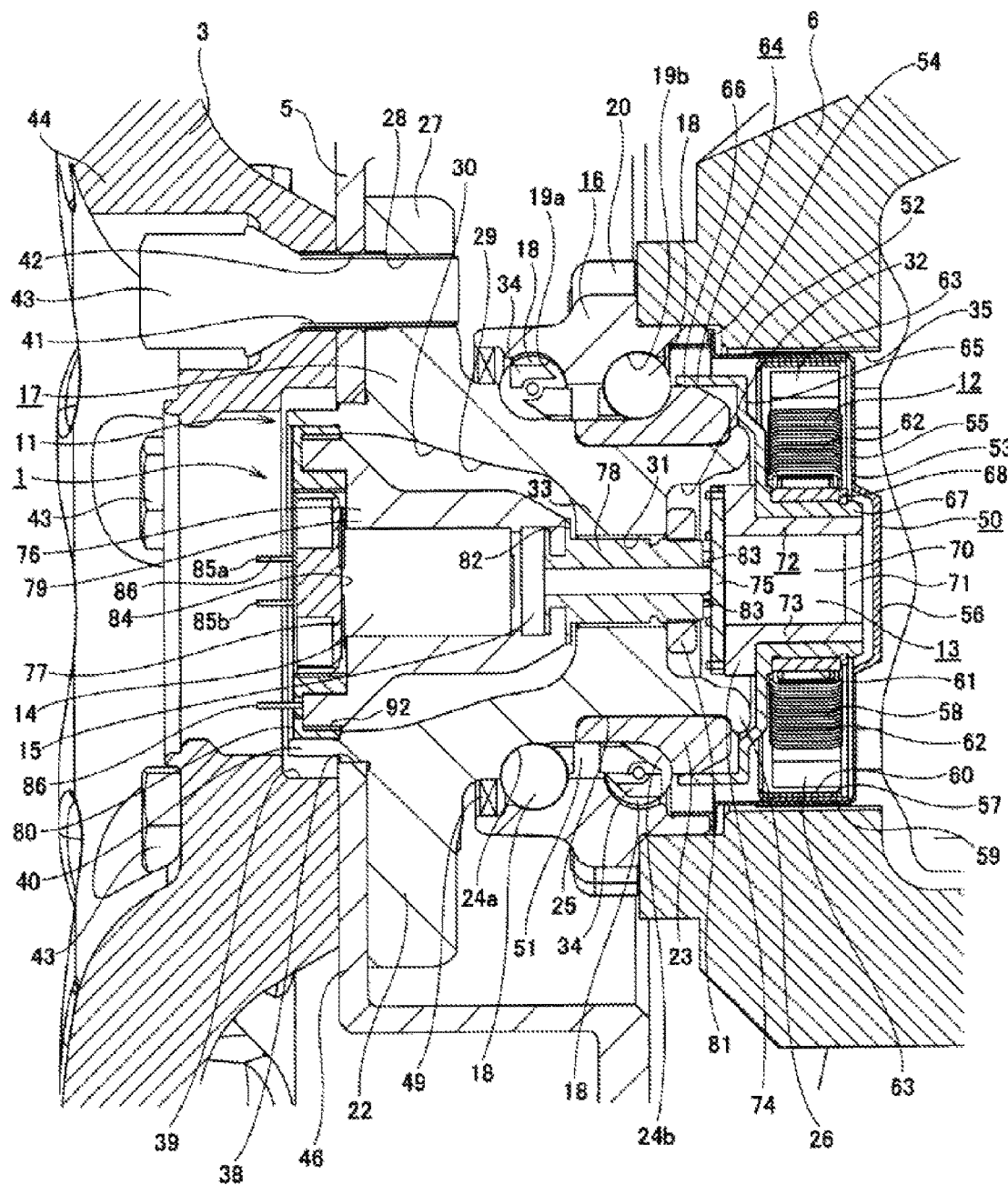
FIG. 2 is an enlarged view of a part II of FIG. 1.
Figure 3:
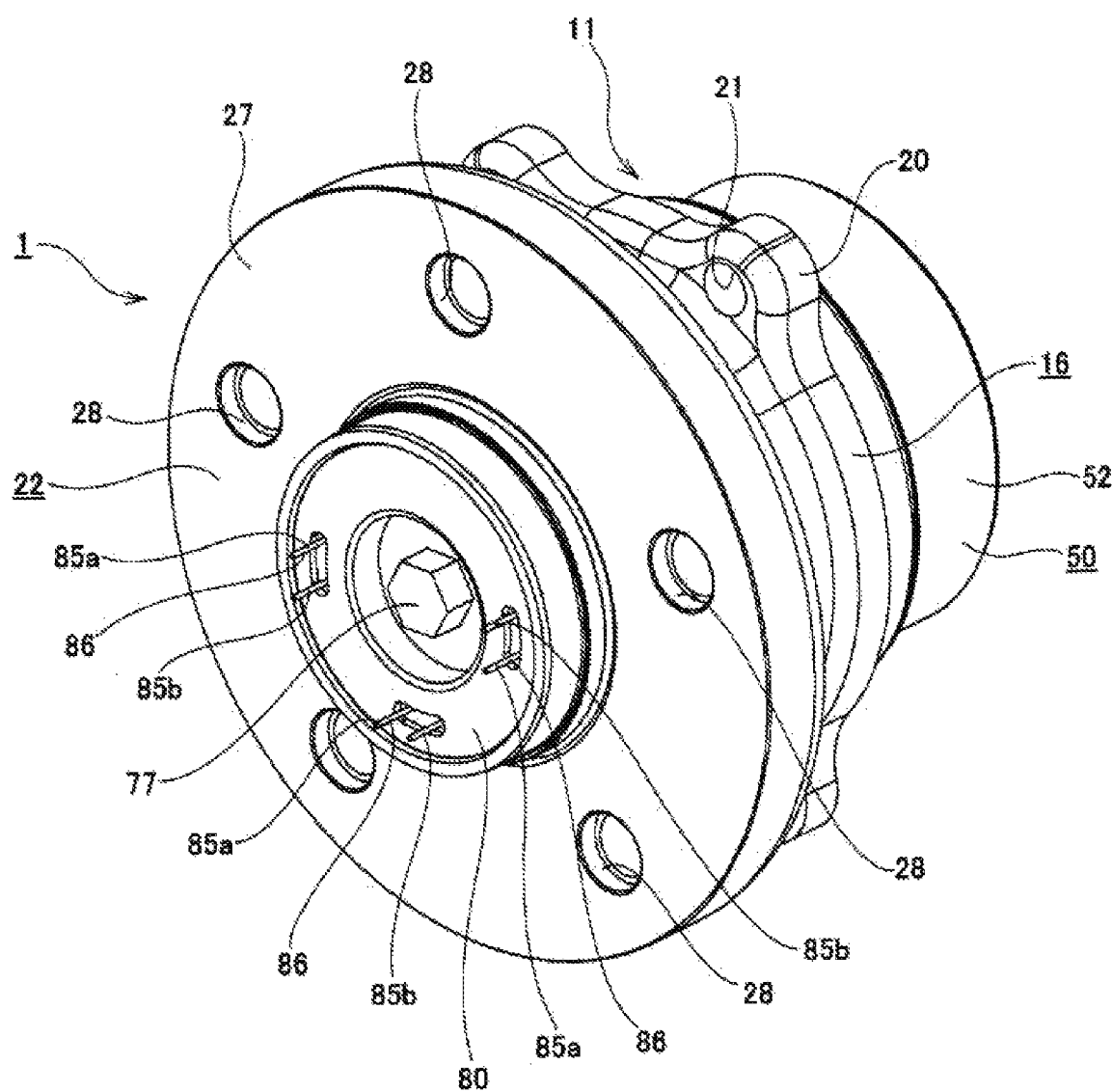
FIG. 3 is a perspective view showing a vehicle wheel supporting rolling bearing unit shown in FIG. 1 which is taken out and seen from an axially outer side.
Figure 4:
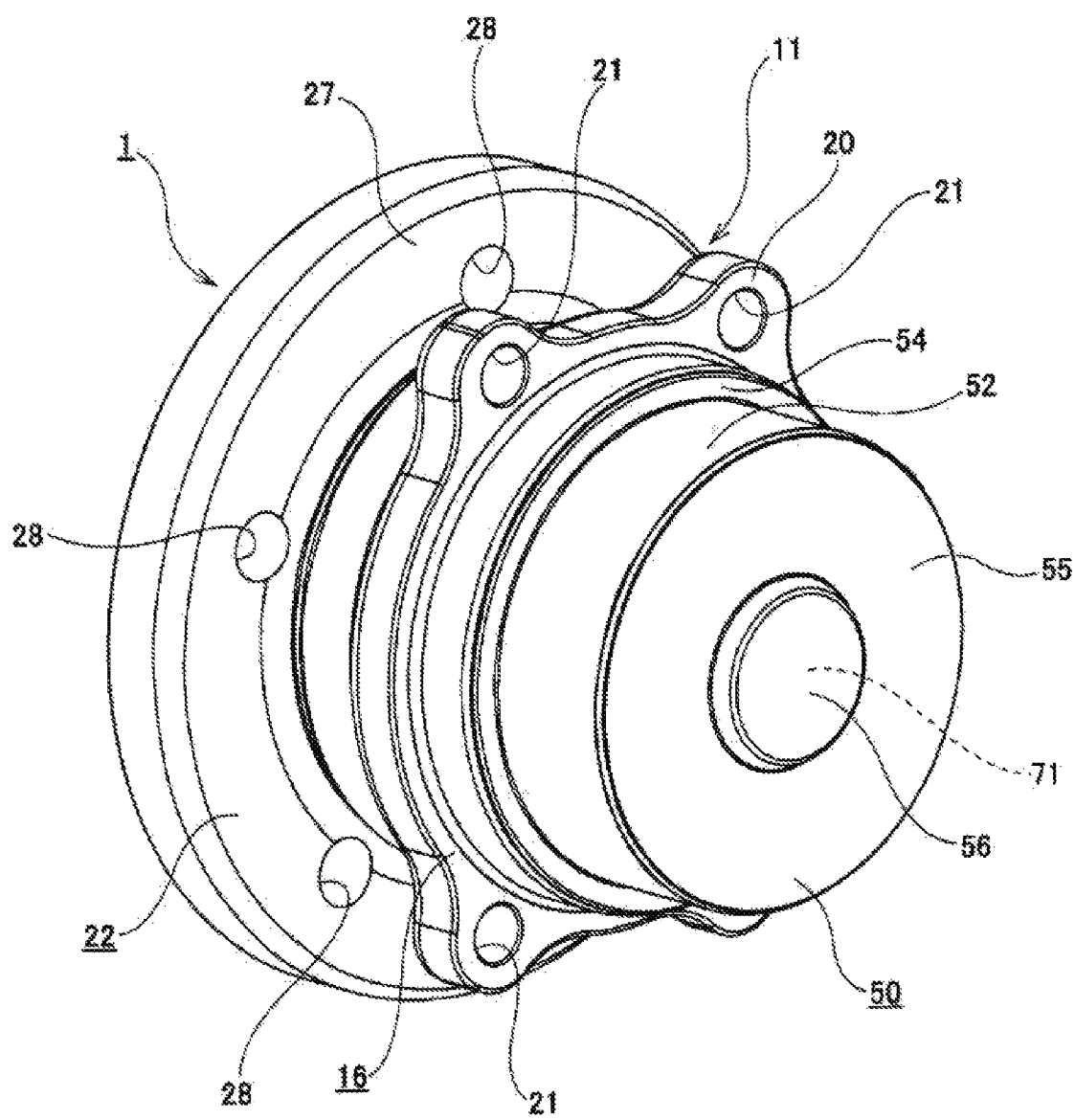
FIG. 4 is a perspective view showing the vehicle wheel supporting rolling bearing unit shown in FIG. 1 which is taken out and seen from an axially inner side.
Figure 5:
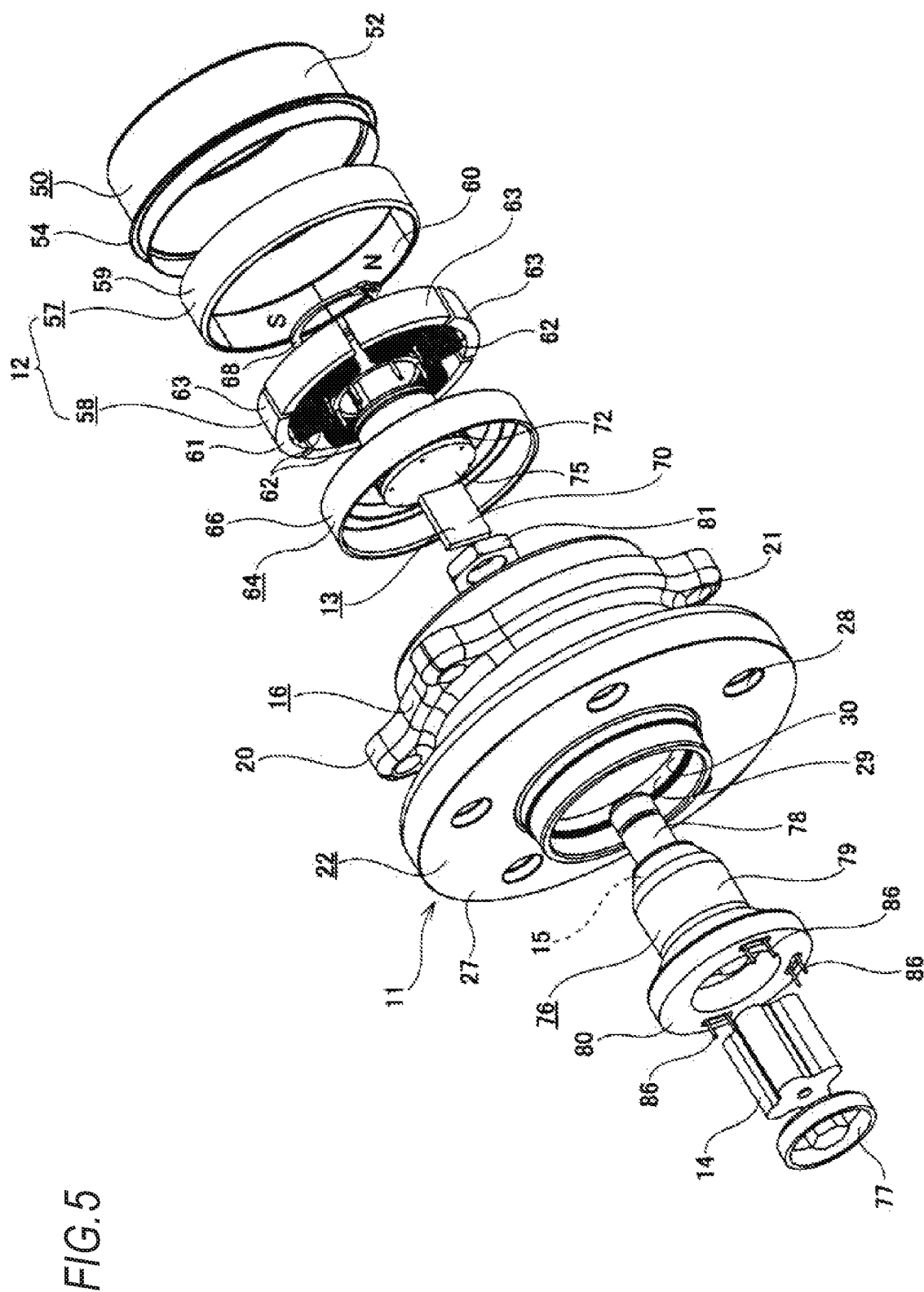
FIG. 5 is an exploded perspective view of the vehicle wheel supporting rolling bearing unit.

Incidentally, in the present specification and claims, "inward" with respect to the axial direction refers to a right side in FIGS. 1 and 2, which is a center side in a vehicle width direction when being the bearing unit 1 assembled to the vehicle. On the contrary, a left side in FIGS. 1 and 2, which is at an outer side in the vehicle width direction, is referred to as "outward" with respect to the axial direction.

The hub 17 is formed by combining a hub body 22 and an inner ring 23, has double-row inner ring raceways 24a, 24b on an outer peripheral surface, and is supported coaxially with the outer ring 16 on an inner diameter side of the outer ring 16. Specifically, the inner ring raceway 24a in an axially outer side row is formed directly at an axially intermediate portion of the outer peripheral surface of the hub body 22, and the inner ring 23 formed with the inner ring raceway 24b in an axially inner side row on the outer peripheral surface is externally fitted and fixed to a small-diameter step part 25 formed at an axially inner end side portion thereof. An axially inner end surface of the inner ring 23 is pressed by a crimping part 26 formed by plastically deforming an axially inner end portion of the hub body 22 radially outward. A rotation side flange 27 for supporting the vehicle wheel is provided at a portion on an axially outer end portion of the hub body 22 which protrudes axially outward than an axially outer end opening part of the outer ring 16. The rotation side flange 27 includes coupling holes (screw holes or through holes) 28, 28 penetrating in the axial direction.

Incidentally, it is also possible to adopt a configuration in which a male screw part is formed at a portion of the hub body protruding axially inward than a portion to which the inner ring is externally fitted and fixed, and the inner ring is supported and fixed to the hub body by screwing a nut into the male screw part and tightening it further.

Particularly, in the present example, a center portion of the hub body 22 includes a through hole 29 penetrating in the axial direction. The through hole 29 includes an outer end side large-diameter part 30 provided from the outer end portion to the intermediate portion in the axial direction, a small-diameter part 31 provided at the inner end side portion of the axially intermediate portion, and an inner end side large-diameter part 32 provided at the axially inner end portion. In the present embodiment, a circular ring shaped inward flange part 33 protruding radially inward than a portion adjacent to both axial sides is formed over an entire circumference of an inner peripheral surface of an inner end side portion of an axially intermediate portion of the hub body 22, so that the through hole 29 is divided into the outer end side large-diameter portion 30, the small-diameter portion 31, and the inner end side large-diameter portion 32. Further, the outer end side large-diameter part 30 is formed into a substantially trapezoidal cross section shape in which an inner diameter dimension gradually increases towards an axially outward direction, while the inner end side large-diameter part 32 is formed into a substantially trapezoidal cross section shape in which the inner diameter dimension gradually increases towards an axially inward direction. In the present embodiment, as described later, the battery 14, the charger 15, and a part of the wireless communication device 13 (axially outer end portion) are arranged in the through hole 29.

The balls 18, 18 are rollably provided between the outer ring raceways 19a, 19b and the inner ring raceways 24a, 24b while being held by cages 34, 34 respectively for each of the two rows in a state where a preload is applied with a back-to-back arrangement. In the illustrated example, diameters, pitch circle diameters, and the contact angles are set to be equal to each other between the both rows of the balls 18, 18. However, the diameters of both rows of the balls are not necessarily the same. For example, by making the diameters of the balls configuring an inner side (axially inner side) ball row larger than those of the balls configuring an outer side (axially outer side) ball row, and the pitch circle diameter of the outer side ball row larger than that of the inner side ball row, it is also possible to ensure a larger volume of a space of the outer end side large-diameter part (increase a capacity of the battery accommodated inside).

In order to support and fix the outer ring 16 to the knuckle 6, a portion (a knuckle side pilot part) of the outer ring 16 provided axially inward than the stationary side flange 20 is inserted into a circular support hole 35 formed in the knuckle 6, and an axially inner side surface of the stationary side flange 20 is abutted against an axially outer end surface of the knuckle 6. In this state, coupling members (bolts) are respectively screwed into or inserted through a plurality of knuckle side attachment holes (through holes or screw holes) provided on the knuckle 6 and the mounting holes 21, 21 which are provided at positions aligned with each other, and further tightened up. Thereby, the outer ring 16 is supported and fixed to the knuckle 6. That is, in the present embodiment, the outer ring 16 corresponds to the stationary side bearing ring member described in the claims which is supported and fixed to the suspension device to be non-rotatable in a use state.

On the other hand, the wheel 3 configuring the vehicle wheel and the brake rotor 5 are coupled and fixed to the rotation side flange 27. Therefore, a positioning cylinder part 40 called a pilot part provided at the axially outer end portion of the hub body 22 is successively inserted (internally fitted) into a brake rotor center hole 38 provided at a center portion of the brake rotor 5 and a wheel center hole 39 provided at a center portion of the wheel 3. Therefore, in a state where the wheel 3 and the brake rotor 5 are positioned in the radial direction, coupling members 43, 43 are respectively screwed into or inserted through the coupling holes 28, 28, wheel coupling holes 41, 41 formed on the wheel 3, and brake rotor coupling holes 42 formed on the brake rotor 5 which are provided at positions aligned together, and further tightened up. Therefore, the wheel 3 and the brake rotor 5 are coupled and fixed to an axially outer side surface of the rotation side flange 27. That is, in the present embodiment, the hub 17 corresponds to the rotation side bearing ring member described in the claims which is coupled and fixed to the vehicle wheel and rotates together with the vehicle wheel.

The wheel 3 is formed of an aluminum alloy in the illustrated example and includes a disk part 44 coupled and fixed to the axially outer side surface of the rotation side flange 27 and a cylindrical rim part 45 provided on an outer peripheral edge portion of the disk part 44. The tire 2 is supported and fixed around the rim part 45. On the other hand, the brake rotor 5 has a crank shaped cross section and is formed in a circular ring plate shape as a whole. The brake rotor 5 includes a hat part 46 provided at an inner diameter side portion and coupled and fixed to the axially outer side surface of the rotation side flange 27, and a sliding part 48 provided at an outer diameter side portion and sandwiched by a pair of pads supported on a caliper configuring the disk brake device 4 during braking operation.

In the vehicle wheel supporting rolling bearing unit 1 of the present embodiment, a seal ring 49 is provided between the axially outer end opening part of the outer ring 16 and an outer peripheral surface of the axially intermediate portion of the hub body 22, and a bottomed cylindrical cover 50 is mounted to an axially inner end opening part of the outer ring 16. Thereby, grease sealed in an internal space 51 where the balls 18, 18 are provided is prevented from leaking into an external space, and foreign matters in the external space are prevented from entering the internal space 51.

The cover 50 includes a cylindrical shaped cylinder portion 52 and a disk-like bottom portion 53, in which an axially outer end portion of the cylinder portion 52 is internally fitted and fixed to an inner peripheral surface of an axially inner end portion of the outer ring 16. An outward collar part (bent part) 54 provided at an axially outer end side portion of the cylinder portion 52 is butted against an axially inner end surface of the outer ring 16, so that the cover 50 is positioned in the axial direction. The bottom portion 53 includes an outer diameter side circular ring portion 55 provided in a state of being bent at a right angle in a radially inward direction from an axially inner end portion of the cylinder portion 52, and a center circular plate portion 56 provided at a center portion of the bottom portion 53 and at a radially inner side of the outer diameter side circular ring portion 55. In the present embodiment, the cylinder portion 52 and the outer diameter side circular ring portion 55 are integrally formed by performing press working on a metal plate such as a stainless steel sheet, and the center circular plate portion 56 is formed of resin with excellent radio wave permeability such as ABS resin or AS resin. In the illustrated structure, the center circular plate portion 56 has a substantially U-shaped cross section, and configured to protrude axially inward than the outer diameter side circular ring portion 55 in a state where an outer peripheral edge portion of the center circular plate portion 56 is coupled and fixed to an inner peripheral edge portion of the outer diameter side circular ring portion 55.

Figure 6:
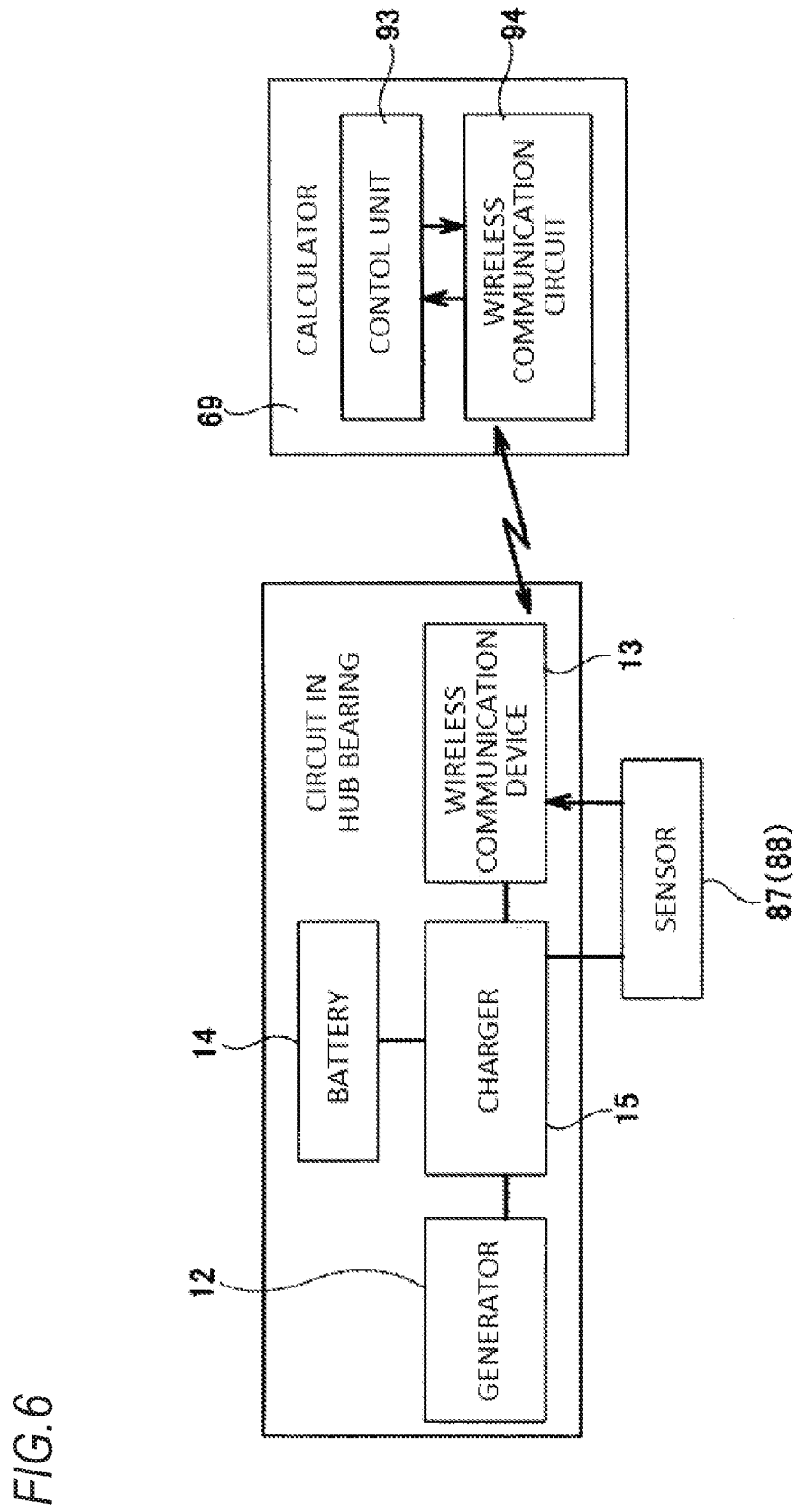
FIG. 6 is a block diagram schematically showing configurations of a circuit incorporated in a hub bearing and a calculator included in the vehicle wheel supporting rolling bearing unit.

In the present embodiment, the vehicle wheel supporting rolling bearing unit 1 is configured by assembling the electric generator 12, the wireless communication device 13, the battery 14, and the charger 15 to the bearing part 11 having the above-described configuration. In the present embodiment, as schematically shown in FIG. 6, the electric generator 12, the wireless communication device (wireless communication circuit) 13, the battery 14 and the charger (charge control circuit) 15 are electrically connected to form a circuit incorporated in the hub bearing.

The electric generator 12 is a magnet type alternating current electric generator which generates alternating current of three phases and generates electric power to be supplied to sensors provided on the vehicle wheel side (sensors 87, 88 on a tire side and a wheel side respectively) described later and the wireless communication device 13 directly or via the battery 14. The electric generator 12 includes a stator 57 and a rotor 58 concentrically arranged with each other. Incidentally, an alternating current electric generator which generates a single phase alternating current may also be used as the electric generator 12.

The stator 57 includes a support ring 59 formed in a cylindrical shape by a magnetic metal plate, and a permanent magnet 60 supported and fixed to an inner peripheral surface of the support ring 59. The permanent magnet 60 is formed in a cylindrical shape and magnetized in the radial direction such that magnetization directions thereof are changed alternately at equal intervals in a circumferential direction. Therefore, S poles and N poles are alternately arranged at equal intervals on an inner peripheral surface of the permanent magnet 60. In the present embodiment, a total of three combinations of S pole and N pole (six poles) are provided on the inner peripheral surface of the permanent magnet 60. Further, the support ring 59 is coupled and fixed to an inner peripheral surface of the axially inner end portion of the cylinder portion 52 configuring the cover 50.

On the other hand, the rotor 58 includes a stator core 61 formed by laminating a plurality of electromagnetic steel sheets, and coils 62, 62. The coils 62, 62 are wound around a plurality of (six in the illustrated example) radially arranged teeth (salient poles) 63, 63 configuring the stator core 61.

In the present embodiment, the stator core 61 configuring the rotor 58 is supported and fixed to an axially inner end portion of the hub 17 by using a mounting member 64 having a crank shaped cross section and formed in a substantially annular shape as a whole. Specifically, the mounting member 64 includes a circular plate portion 65, a large-diameter cylinder portion 66 provided in a state of being bent in an axially outer side direction from an outer diameter side end portion of the circular plate portion 65, and a small-diameter cylinder portion 67 provided in a state of being bent in an axially inner side direction from an inner diameter side end portion of the circular plate portion 65. The stator core 61 is externally fitted and fixed to the small-diameter cylinder portion 67 in a state where the large-diameter cylinder portion 66 is externally fitted and fixed to an axially inner end portion (shoulder portion) of the inner ring 23 configuring the hub 17 by interference fit. In addition, a substantially C-shaped retaining ring 68 is locked with a portion of the small-diameter cylinder portion 67 protruding axially inward from a portion where the stator core 61 is externally fitted, so as to prevent the rotor 58 from falling off from the mounting member 64 in the axial direction.

In the present embodiment, the stator 57 and the rotor 58 are arranged coaxially in a state where the stator 57 is coupled and fixed to an inner peripheral surface of the cylinder portion 52 configuring the cover 50, and the rotor 58 is supported and fixed to the inner ring 23 via the mounting member 64, and an outer peripheral surface of the rotor 58 (teeth 63, 63) faces the inner peripheral surface of the permanent magnet 60 configuring the stator 57 in the radial direction via a minute clearance. By adopting the above configuration, when the rotor 58 rotates together with the hub 17, electromotive force is generated by an electromagnetic induction action of the coils 62, 62. In other words, the electric generator 12 generates electric power by rotating the hub 17 together with the vehicle wheel.

The wireless communication device 13 performs wireless communication (both transmission and reception are possible in the first embodiment) with the calculator 69 which is the electronic equipment provided on the vehicle body 7 side and includes a wireless communication circuit (substrate) 70 and an antenna 71. The wireless communication device 13 is arranged at a radially inner side of the small-diameter cylinder portion 67 configuring the mounting member 64 in a state of being fixed in a case 72 by resin molding. In the present embodiment, the case 72 is formed in a stepped cylindrical shape, and a small-diameter portion 73 provided from an axially intermediate portion to an inner end portion is internally fitted and fixed to the small-diameter cylinder portion 67 configuring the mounting member 64 from an axially outer side direction. At this time, an axially inner side surface of the large-diameter portion 74 provided at an axially outer end portion of the case 72 is butted against an axially outer side surface of the circular plate portion 65 configuring the mounting member 64. Therefore, in the present embodiment, the wireless communication device 13 is also supported and fixed to the hub 17 (inner ring 23) using the mounting member 64.

An axially outer end opening part of the case 72 is closed by a disk-like relay substrate 75 separate from the case 72. The relay substrate 75 includes wiring and a plurality of terminals (not shown) and electrically connected with the wireless communication circuit 70 accommodated in the case 72. Both ends of the coils 62, 62 configuring the electric generator 12, which are inserted through the large-diameter portion 74 configuring the case 72 in the axial direction, are connected to the wiring formed on an axially outer side surface of the relay substrate 75. On the other hand, the antenna 71 electrically connected to the wireless communication circuit 70 is arranged at an axially inner end portion of the case 72. In the present embodiment, by arranging the antenna 71 in this manner, the antenna 71 is made to adjacently face the resin-made center circular plate portion 56 configuring the cover 50. Accordingly, a wireless signal transmitted and received by the antenna 71 is effectively prevent from being obstructed by the cover 50, so that wireless communication can be efficiently performed between the wireless communication device 13 and the calculator 69.

The battery 14 stores electric power generated by the electric generator 12 and includes a plurality of storage batteries (for example, nickel hydrogen batteries) connected in series. The charger 15 rectifies a generated voltage of the electric generator 12 and controls charging of the battery 14 according to the generated voltage (input voltage). The charger 15 includes a rectifier circuit for converting an AC voltage generated by the electric generator 12 into a DC voltage, a voltage control circuit for outputting a constant voltage (outputting a DC voltage controlled to a certain voltage value) regardless of a change in the rotation speed of the rotor 58, and a power control circuit for controlling switching of power supply to the sensor and the wireless communication device 13 according to the generated voltage (output voltage) of the electric generator 12 and also controlling power supply to the battery 14.

The power control circuit of the charger 15 has a function of monitoring the output voltage of the electric generator 12. When a traveling speed of the vehicle is high, and it is determined that the sensors (sensors 87, 88 on a tire side and a wheel side respectively) and the wireless communication device 13 can be operated by only the output voltage of the electric generator 12, the output voltage (converted to the DC voltage) of the electric generator 12 is supplied to the sensors and the wireless communication device 13 so as to operate the sensors and the wireless communication device 13. Then, the battery 14 is charged with surplus power. On the contrary, when the traveling speed of the vehicle is low, and it is determined that the sensors and the wireless communication device 13 cannot be operated by only the output voltage of the electric generator 12, electric power from the battery 14 is supplied to the sensors and the wireless communication device 13 so as to operate the sensors and the wireless communication device 13. As described above, in the present invention, only when the traveling speed of the vehicle is low and the power generation amount of the electric generator 12 is not sufficient, the electric power of the battery 14 is used to operate the sensors and the wireless communication device 13. Accordingly, a frequency of use of the battery 14 is reduced, and the storage capacity of the battery 14 is reduced.

The output voltage of the electric generator 12 varies according to a rotation speed of the hub 17 supporting and fixing the rotor 58. The output voltage of the electric generator 12 decreases as the rotation speed of the hub 17 decreases (when the traveling speed of the vehicle is low), and increases when the rotation speed of the hub 17 increases (when the traveling speed of the vehicle is high). Therefore, the charger 15 detects the output voltage of the electric generator 12 and calculates the rotation speed of the hub 17 (or the traveling speed of the vehicle).

In a case where the rotation speed of the hub 17 (the traveling speed of the vehicle) is higher than or equal to a predetermined speed such that the sensors and the wireless communication device 13 can be operated by only the output voltage of the electric generator 12, as described above, the charger 15 supplies electric power from the electric generator 12 to the sensors and the wireless communication device 13, and instructs that wireless communication frequency which is the frequency of performing wireless communication between the wireless communication device 13 and the calculator 69 is certain. That is, the wireless communication is performed at a certain time interval between the wireless communication device 13 and the calculator 69 even if the rotation speed of the hub 17 (the traveling speed of the vehicle) is higher than or equal to the predetermined speed.

Figure 7:
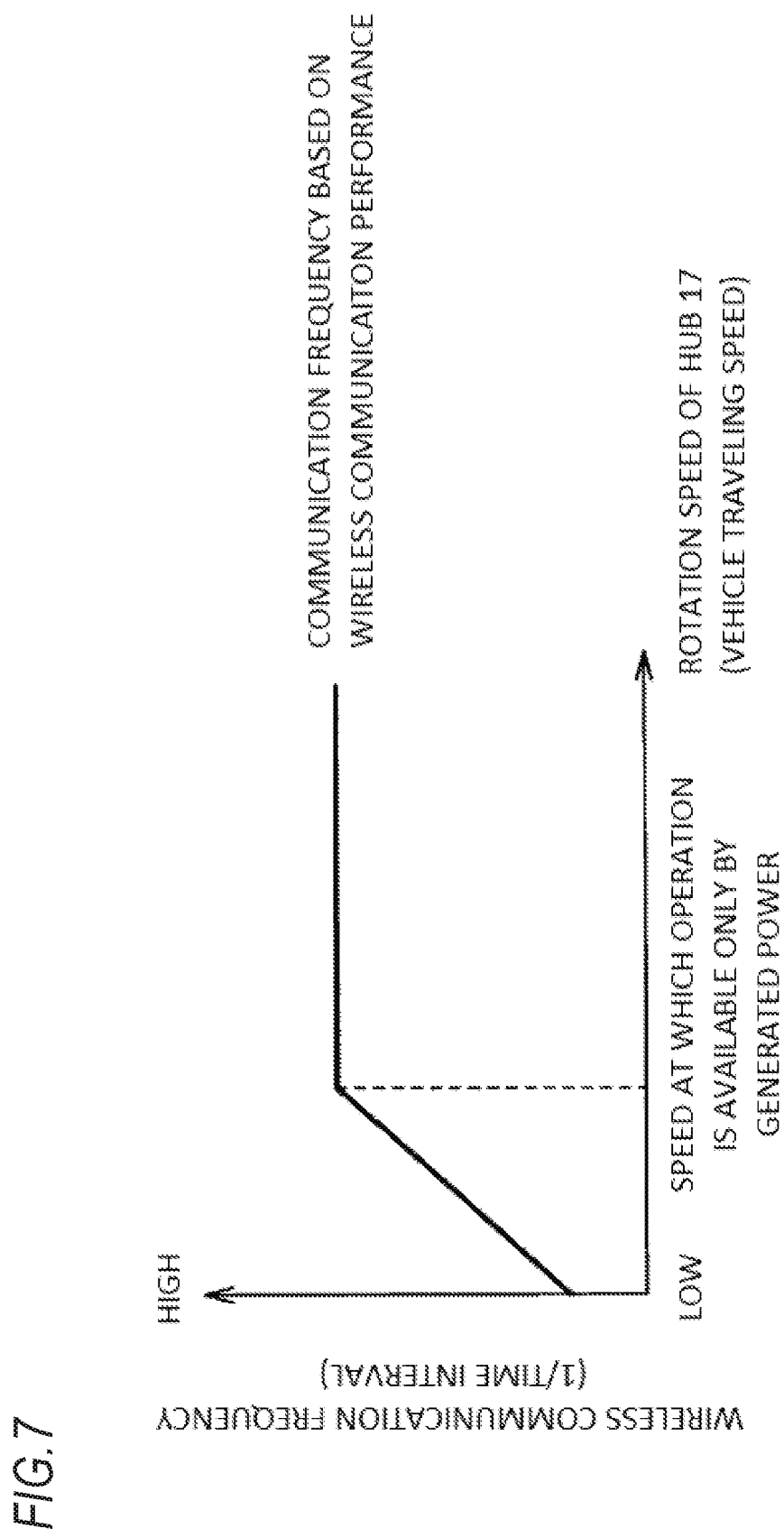
FIG. 7 is a graph showing a relationship between a vehicle speed and a wireless communication frequency.
Figure 8:
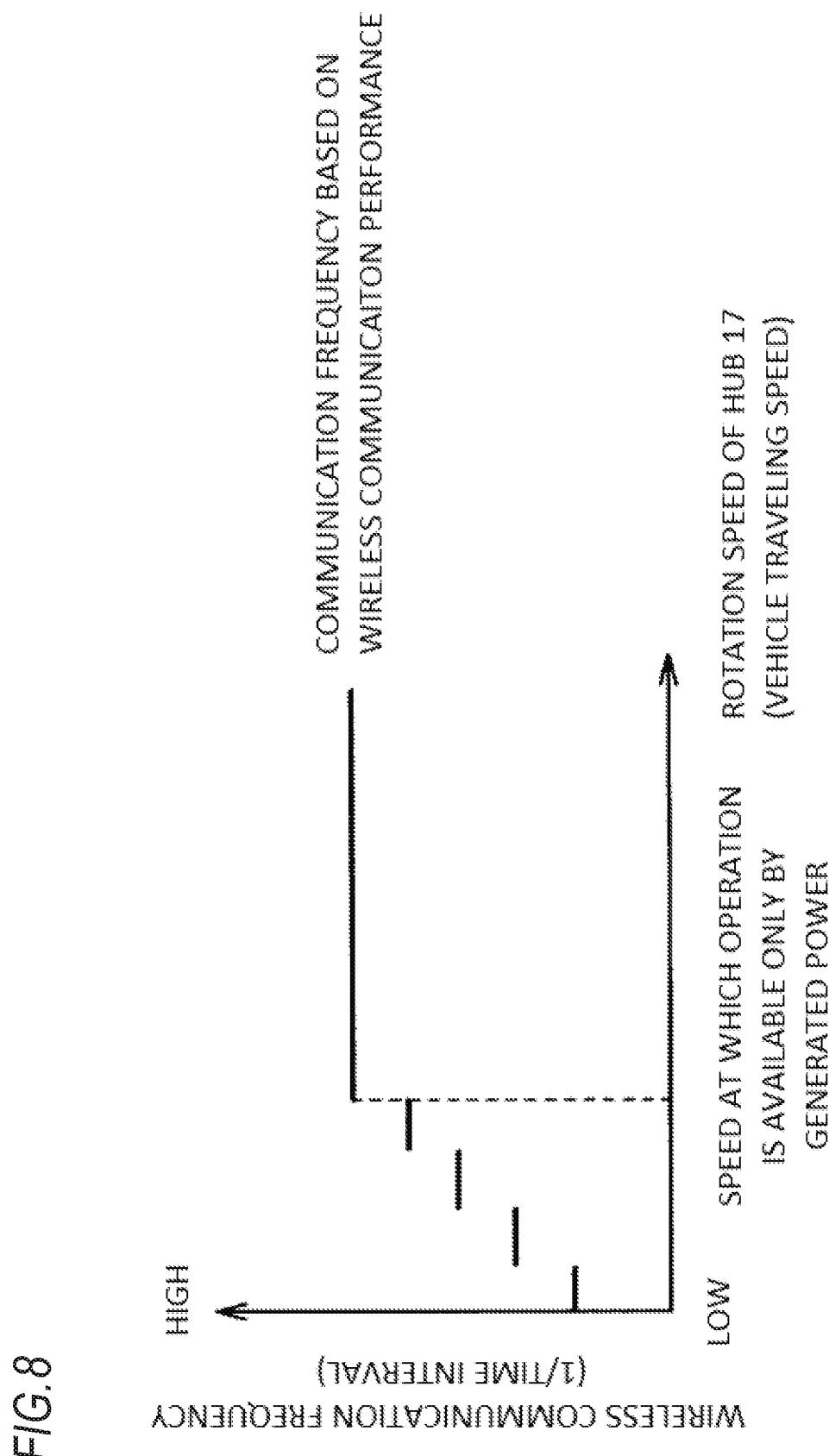
FIG. 8 is a graph showing another example of the relationship between a vehicle speed and a wireless communication frequency.

On the contrary, in a case where the rotation speed of the hub 17 (the traveling speed of the vehicle) is lower than a predetermined speed such that the sensors and the wireless communication device 13 cannot be operated by only the output voltage of the electric generator 12, as described above, the charger 15 supplies electric power from the battery 14 to the sensors and the wireless communication device 13, and instructs that the wireless communication frequency with the wireless communication device 13 is changed according to the rotation speed of the hub (traveling speed of the vehicle). Specifically, as shown in FIG. 7 for example, when the wireless communication frequency is proportional to the rotation speed of the hub 17 (the traveling speed of the vehicle), a traveling distance of the vehicle at each time interval of the wireless communication may be made substantially constant. In this case, update frequency of sensor information (that is, wireless communication frequency) in vehicle motion control can be appropriately set by appropriately determining the traveling distance. Alternatively, as shown in FIG. 8, when the wireless communication frequency is not proportional to the rotation speed of the hub 17 (the traveling speed of the vehicle), the wireless communication frequency can be set in stages with a plurality of threshold values which are set according to the rotation speed of the hub 17 (the traveling speed of the vehicle). In the present embodiment, the wireless communication frequency may be obtained based on the rotation speed of the hub 17 (the traveling speed of the vehicle, or the output voltage of the electric generator 12) by using a calculation formula, or may also be obtained by using a chart (a table or a map) showing a relationship between the speed (voltage) and the wireless communication frequency prepared in advance.

As described above, the charger 15 can determine the wireless communication frequency by using the rotation speed of the hub 17 and can also determine the wireless communication frequency by using the traveling speed of the vehicle which is calculated based on the output voltage of the electric generator 12 or the rotation speed of the hub 17. Also, the wireless communication frequency can be directly determined based on the output voltage of the electric generator 12.

In the present embodiment, when a power storage amount of the battery 14 decreases and the power generation amount of the electric generator 12 also decreases, there is a possibility that not only the sensors and the wireless communication device 13 cannot be operated, but also the charger 15 cannot be operated. Therefore, it is advantageous to prevent the power storage amount of the battery 14 from becoming equal to or less than a minimum operation power storage amount. Therefore, in the present embodiment, in a case where the power storage amount of the battery 14 is higher than the minimum operation power storage amount and equal to or less than a predetermined reference value, and the sensors and the wireless communication device 13 cannot be operated by only the power generation amount of the electric generator 12, another wireless communication frequency (with lower frequency, and a longer time interval) set in advance is adopted instead of the wireless communication frequency determined according to the rotation speed of the hub 17 (the traveling speed of the vehicle) as described above. Therefore, the power consumption can be further reduced, and decrease in the power storage amount of the battery 14 can be reduced.

In the present embodiment, in a state of being electrically connected, the battery 14 and the charger 15 having the above configuration are accommodated in the battery case 76 having a opening part at an axially outer end side and covered (sealed) by a cap 77 from the axially outer side direction.

The battery case 76 includes a metal shaft-shaped connection part 78 provided at an axially inner end portion, a hollow cylindrical accommodation part 79 which is formed of synthetic resin and provided from an axially intermediate portion to an outer end portion, and a metal circular ring shaped connector part 80 provided to cover an entire periphery of an axially outer end portion of the accommodation part 79. When the battery case 76 is disposed in the through hole 29 of the hub body 22, the connection part 78 is arranged inside the small-diameter portion 31 and the inner end side large-diameter portion 32, and the accommodation part 79 and the connector part 80 are arranged inside the outer end side large-diameter portion 30. In this state, the connector part 80 is internally fitted inside the positioning cylinder part 40 configuring the hub body 22 without rattling in the radial direction, and an axially inner end surface of a radially outer end portion of the connector part 80 is abutted against a step surface 92 provided adjacent to an axially inner side of the inner peripheral surface of the positioning cylinder part 40. Further, an annular nut 81 is screwed into a portion of the connection part 78 protruding into the inner end side large-diameter portion 32. Thus, a part of the hub body 22 is sandwiched from both sides in the axial direction between the nut 81 and the axially inner end surface of the radially outer end portion of the connector part 80, and the battery case 76 is supported and fixed inside the hub body 22.

As described above, in a state where the battery case 76 is supported and fixed, a plurality of terminals 83, 83 provided at the tip end portion (axially inner end portion) of the connection part 78 are electrically connected so as to be elastically pressed to the relay substrate 75. Specifically, springs (not shown) provided at base end portions of the terminals 83, 83 are elastically deformed while the terminals 83, 83 are abutted against the relay substrate 75. Therefore, even when the position of the relay substrate 75 (or the battery case 76) in the axial direction is slightly deviated, the terminals 83, 83 can be securely connected to the relay substrate 75. The terminals 83, 83 provided on the connection part 78 respectively includes a terminal for receiving the AC voltage generated by the electric generator 12 from a relay substrate 75 side, a terminal for transmitting the voltage stored in the battery 14 to the relay substrate 75 side, and a terminal for transmitting an output signal the sensors connected to the connector part 80 (sensors 87, 88 on the tire side and the wheel side respectively) to the relay substrate 75 side. A plurality of signal lines and power lines (not shown) are arranged in the connection part 78 in a molded and insulated state, in which the power lines are connected to the charger 15 (battery 14), and the signal lines are connected to the connector part 80.

In the accommodation part 79, the charger 15 is arranged at a bottom side (axially inner side), and the battery 14 is arranged at an opening part side (axially outer side). Accordingly, in a state where the battery 14 is arranged in the accommodation part 79 and attached (screwed and fixed) with the cap 77, a pair of terminals 84 electrically connected to the charger 15 are connected to electrodes provided at both axial end portions of the battery 14. In the present embodiment, one of the terminals 84 is provided on an inner surface (axially inner side surface) of the cap 77. According to the above configuration, electric power generated by the electric generator 12 is rectified by a full-wave rectification circuit configuring the charger 15.

The connector part 80 is used to connect wiring (89*a*, 89*c*) for connecting one or more sensors (sensors 87, 88 on the tire side and the wheel side respectively) provided on the vehicle wheel, and the connector part 80 is positioned inside (outer peripheral edge portion) the wheel center hole 39 in a state where the wheel 3 is coupled and fixed to the vehicle wheel supporting rolling bearing unit 1. In other words, the connector part 80 is provided at a portion located axially outermost in the vehicle wheel supporting rolling bearing unit 1 of the present embodiment. The connector part 80 includes a plurality of (three in the illustrated example) sensor connectors (male connectors) 86, 86 each protruding (exposed) in the axial direction from an axially outer end surface of the battery case 76 and including a pair of pins 85*a*, 85*b*. Further, types (functions and uses) of both pins 85*a*, 85*b* can be appropriately determined according to application for an analog signal, a digital signal, or the like. For example, one pin 85*a* can serve as a power supply pin and the other pin 85*b* can serve as a signal pin. In this case, one of the pins 85*a* is electrically connected to the charger 15, and the other pin 85*b* is connected to the wireless communication device 13 via the relay substrate 75 as described above.

In the present embodiment, from the viewpoint of reducing the cost at the time of tire replacement, as shown in FIG. 1, among the sensors for measuring state quantity of the tire 2, only the tire side sensor 87 for measuring state quantity which cannot be measured unless the sensor is directly provided in the tire 2 such as a wear sensor, a tire distortion sensor and a temperature sensor is directly provided in the tire 2. On the other hand, the wheel side sensor 88 for measuring state quantity which can be measured without providing the sensor in the tire 2 such as an air pressure sensor, a wheel distortion sensor and an acceleration sensor is provided on the wheel 3 (at the rim part 45 in the illustrated example). The wheel side sensor 88 and one of the sensor connectors 86 are connected by wiring 89*a* arranged along an axially inner side surface of the disk part 44 configuring the wheel 3, and a female connector 91 provided at an end portion of the wiring 89*a*.

On the other hand, the tire side sensor 87 is connected via an intermediate connector 90 attached to the wheel 3 (rim part 45). Specifically, the tire side sensor 87 and the intermediate connector 90 are connected by wiring 89*b*, and the intermediate connector 90 and another sensor connector 86 are connected by wiring 89*c* and the female connector 91. Accordingly, by separating the wiring 89*b* and the wiring 89*c* between the tire side and the wheel side, the operation at the time of tire replacement can be performed easily.

Incidentally, for the remaining one sensor connector 86, although no sensor is connected, it is possible to connect a sensor as necessary. Further, the number of sensor connectors can be increased according to the battery capacity, and the number of connectable sensors can be increased.

In the vehicle wheel supporting rolling bearing unit 1 of the present embodiment having the above-described configuration, when the vehicle wheel (tire 2 and wheel 3) rotates during the traveling of the vehicle, the hub 17, which is the rotation side bearing ring member, of the bearing part 11 rotates. Then, the rotor 58 supported and fixed to the axially inner end portion of the hub 17 rotates relatively to the stator 57 supported and fixed to the outer ring 16 which is the stationary side bearing ring member. Accordingly, the electric generator 12 configured by the stator 57 and the rotor 58 generates electric power. The AC voltage generated by the electric generator 12 is transmitted to the charger 15 in the battery case 76 through a cable (not shown) or the like, and converted into a DC voltage.

Further, the charger 15 detects (monitor) the output voltage of the electric generator 12 and determines whether to supply the output voltage of the electric generator 12 to the sensors and the wireless communication device 13 directly, or to supply the electric power of the battery 14 to the sensors and the wireless communication device 13. In any case, the electric power is supplied to the sensor through the sensor connector 86, the female connector 91 configuring the connector part 80 and the wirings 89*a* to 89*c*. Accordingly, the sensors (sensors 87, 88 on the tire side and the wheel side respectively) detect the state quantity (for example, tire air pressure, distortion, vertical force, acceleration, temperature, or the like) of the tire 2 and the wheel 3.

Output signals of the tire side sensor 87 and the wheel side sensor 88 are transmitted to the sensor connector 86 through the wiring 89*a* to 89*c*, and then transmitted to the wireless communication device 13 via the connection part 78 and the relay substrate 75. The output signals of the tire side sensor 87 and the wheel side sensor 88 are wirelessly transmitted by the antenna 71 configuring the wireless communication device 13 through the center circular plate portion 56 of the cover 50 to the calculator 69 arranged at the vehicle body 7 side at the wireless communication frequency determined based on the rotation speed of the hub 17 (the traveling speed of the vehicle). Accordingly, the calculator 69 receives the state quantity of the tire 2 and the wheel 3 which is the output signals of the tire side sensor 87 and the wheel side sensor 88, and uses the state quantity for vehicle motion control, for example.

In the vehicle wheel supporting rolling bearing unit 1 of the present embodiment, a signal relating to a traveling speed of the vehicle is received by the wireless communication device 13 (antenna 71) from the calculator 69. Only when the traveling speed is equal to or higher than a predetermined value to be determined as in a traveling state, electric power is supplied to the tire side sensor 87 and the wheel side sensor 88, and when the traveling speed is lower than the predetermined value to be determined to be substantially stopped, the supply of electric power is stopped. Accordingly, unnecessary power consumption of the battery 14 can be reduced by performing the above power supply control.

According to the vehicle wheel supporting rolling bearing unit 1 of the present embodiment having the above configuration, capacity of the battery 14 can be reduced.

That is, in the present embodiment, the frequency of wireless communication (wireless communication frequency) performed between the wireless communication device 13 and the calculator 69 disposed on the vehicle body side is changed according to the rotation speed of the hub 17 (the traveling speed of the vehicle) in low speed traveling when the sensor and the wireless communication device 13 are operated by the electronic power supplied by the battery 14. Specifically, the wireless communication frequency increases (the time interval between wireless communication is reduced) when the traveling speed of the vehicle is high (the power generation amount of the electric generator 12 is increased, and the electric power supplied to the battery 14 is large), and the wireless communication frequency decreases (the time interval between wireless communication is increased) when the traveling speed of the vehicle is low (the power generation amount of the electric generator 12 is reduced, and the electric power supplied to the battery 14 is few). Therefore, power consumption of the battery 14 used by the wireless communication device 13 can be effectively reduced in the present embodiment. Therefore, the storage capacity of the battery 14 can be reduced, so that a volume of the battery 14 can be reduced, and the cost can also be reduced. Further, since the wireless communication frequency is changed according to the rotation speed of the hub 17 (the traveling speed of the vehicle), degradation of performance related to vehicle motion control can be suppressed even when the wireless communication frequency is reduced and an update interval of the sensor information becomes longer. In other word, since a time required for the vehicle to travel a certain distance increases as the vehicle speed decreases, a number of times of performing wireless communication while the vehicle travels the certain distance can be kept substantially constant by changing the wireless communication frequency according to the vehicle speed, so that the degradation of the performance related to vehicle motion control can be suppressed.

In the present embodiment, since the tire side sensor 87 and the wheel side sensor 88 are provided not on a vehicle wheel supporting rolling bearing unit 1 side but on a vehicle wheel (tire 2 and wheel 3) side, for example, even when detecting force acting on the tire 2, accurate detection can be performed regardless of an operation state of the disk brake device 4 (an action state of the brake).

In the present embodiment, the electric power generated by the electric generator 12 provided in the vehicle wheel supporting rolling bearing unit 1 can be supplied to the tire side sensor 87 and the wheel side sensor 88. Further, the output signals of the tire side sensor 87 and the wheel side sensor 88 can be wirelessly transmitted from the wireless communication device 13 provided on the vehicle wheel supporting rolling bearing unit 1 to the calculator 69 provided at the vehicle body 7 side. Therefore, when the vehicle wheel supporting rolling bearing unit 1 is mounted to the knuckle 6, handling of the harness is not necessarily performed, and assembly workability can be improved accordingly.

Even when replacing the tire 2, the electric generator 12, the wireless communication device 13, the battery 14, and the charger 15 provided in the vehicle wheel supporting rolling bearing unit 1 can be continuously used as they are (it shall be sufficient to replace only the tire side sensor 87 provided in the tire 2). Therefore, as compared with a case where the power generation device or the like is provided in the tire, the cost at the time of the tire replacement can be kept low.

In the present embodiment, even when tire rotation (change of tire position) is performed to prevent uneven wear, since there is no change in an attachment position of the vehicle wheel supporting rolling bearing unit 1 itself having a wireless communication function, a problem in determining from which tire a signal is received by the calculator 69 at the vehicle body 7 side can be prevented.

Second Embodiment

In the first embodiment described above, the wireless communication frequency which is the frequency of performing wireless communication (transmitting sensor information) between the wireless communication device 13 and the calculator 69 on the vehicle body side is determined by the charger 15 disposed in the vehicle wheel supporting rolling bearing unit 1. However, in the second embodiment, referring to FIG. 6, the wireless communication frequency is determined on a calculator 69 side based on information on a traveling speed of a vehicle with a control unit 93 configuring the calculator 69 provided on the vehicle body side. A method of determining the wireless communication frequency by the calculator 69 (control unit 93) is similar to the method of determining the wireless communication frequency by the charger 15 as described in the first embodiment. Further, the determined wireless communication frequency is transmitted from a wireless communication circuit 94 of the calculator 69 to the wireless communication device 13, and wireless communication is performed at the wireless communication frequency. In the second embodiment having the above configuration, a function of detecting an output voltage of the electric generator 12 is not necessary for the charger 15.

Other configurations and operational effects of the second embodiment are the same as those in the first embodiment.

INDUSTRIAL APPLICABILITY

In the embodiments described above, an example where the sensor is mounted on the vehicle wheel (wheel and tire) is described, but the sensor may also be mounted on the vehicle wheel supporting rolling bearing unit. In the embodiments, the case where the diameters and the pitch circle diameters of balls in both rows are equal to each other has been described. However, for example, a case where the diameter of the balls configuring the ball row on the inner side (axially inner side) is larger than that of the balls configuring the ball row on the outer side (axially outer side), and the pitch circle diameter of the ball row on the outer side is larger than that of the ball row on the inner side can may be adopted. According to the above configuration, it is also possible to ensure a larger volume of a space of the outer end side large-diameter part (increase a capacity of the battery accommodated inside). Further, the vehicle wheel supporting rolling bearing unit of the present invention may be applied not only to a driven wheel, but also to a driving wheel.

The present invention is not limited to the above-mentioned embodiment, but modifications and applications made by one skilled in the art based on mutual combination of the configurations of the embodiments, description in the specification, and well-known art, is within the scope and protection of the present invention.

This application is based on Japanese Patent Application No. 2015-237376 filed on Dec. 4, 2015, and Japanese Patent Application No. 2016-6139 filed on Jan. 15, 2016, the contents of which are incorporated herein by reference.

DESCRIPTION OF REFERENCE NUMERALS 1 vehicle wheel supporting rolling bearing unit
6 knuckle (suspension device)
7 vehicle body
11 bearing part
12 electric generator
13 wireless communication device
14 battery
15 charger
16 outer ring (outer diameter side bearing ring member)
17 hub (bearing ring member)
18 ball (rolling element)
19a, 19b outer ring raceway
24a, 24b inner ring raceway
70 wireless communication circuit
87 tire side sensor
88 wheel side sensor
93 control unit
94 wireless communication circuit

The invention claimed is:

1. A rolling bearing unit for supporting a vehicle wheel, comprising:
   a bearing part including an outer diameter side bearing ring member having an outer ring raceway on an inner peripheral surface, an inner diameter side bearing ring member having an inner ring raceway on an outer peripheral surface, and a plurality of rolling elements rollably provided between the outer ring raceway and the inner ring raceway, wherein one of the outer diameter side bearing ring member and the inner diameter side bearing ring member is a stationary side bearing ring member which is supported and fixed to a suspension device and non-rotatable in a use state, and the other bearing ring member is a rotation side bearing ring member which is coupled and fixed to a vehicle wheel and is configured to rotate together with the vehicle wheel;
   a wireless communication device configured to wirelessly communicate a signal including an output signal of a sensor with an electronic equipment arranged on a vehicle body side;
   an electric generator including a stator supported by the stationary side bearing ring member and a rotor supported by the rotation side bearing ring member, and configured to generate electric power based on relative rotation between the stator and the rotor; and
   a battery configured to store the electric power generated by the electric generator,
   wherein electric power from the battery is supplied to the sensor and the wireless communication device when an power generation amount of the electric generator is not sufficient to operate the sensor and the wireless communication device, and
   wherein the wireless communication device is configured to change a wireless communication frequency which is a frequency of performing wireless communication according to a rotation speed of the rotation side bearing ring member or a traveling speed of a vehicle.

2. The rolling bearing unit according to claim 1,
wherein an output voltage of the electric generator is used to obtain the rotation speed of the rotation side bearing ring member or the traveling speed of the vehicle.

3. The rolling bearing unit according to claim 1,
wherein the wireless communication frequency is increased when the rotation speed of the rotation side bearing ring member or the traveling speed of the vehicle is equal to or higher than a predetermined speed, and the wireless 5 communication frequency is decreased when the rotation speed of the rotation side bearing ring member or the traveling speed of the vehicle is lower than the predetermined speed.

4. The rolling bearing unit according to claim 3,
wherein the wireless communication frequency is changed based on the rotation speed of the rotation side bearing ring member, the traveling speed of the vehicle or the output voltage of the electric generator.

5. The rolling bearing unit according to claim 3,
wherein the wireless communication frequency is proportional to the rotation speed of the rotation side bearing ring member or the traveling speed of the vehicle so that a traveling distance of the vehicle at each time interval of the wireless communication is made substantially constant.

6. The rolling bearing unit according to claim 3,
wherein the wireless communication frequency is set in stages with a plurality of threshold values which are set according to the rotation speed of the rotation side bearing ring member or the traveling speed of the vehicle.

7. The rolling bearing unit according to claim 3,
wherein when a power storage amount of the battery is higher than a minimum operation power storage amount and equal to or less than a predetermined reference value, and the sensor and the wireless communication device cannot be operated by only the power generation amount of the electric generator, another wireless communication frequency, corresponding to lower frequency and a longer time interval, set in advance is adopted instead of the wireless communication frequency determined according to the rotation speed of the rotation side bearing ring member or the traveling speed of the vehicle.

* * * * *